No. 789,212. PATENTED MAY 9, 1905.
B. P. DUKE.
END GATE ATTACHMENT.
APPLICATION FILED APR. 29, 1904.

2 SHEETS—SHEET 1.

Witnesses
M. Bloudel
E. B. McBath

Inventor
B. P. Duke.

By Omara Brock
Attorneys

No. 789,212. PATENTED MAY 9, 1905.
B. P. DUKE.
END GATE ATTACHMENT.
APPLICATION FILED APR. 29, 1904.
2 SHEETS—SHEET 2.
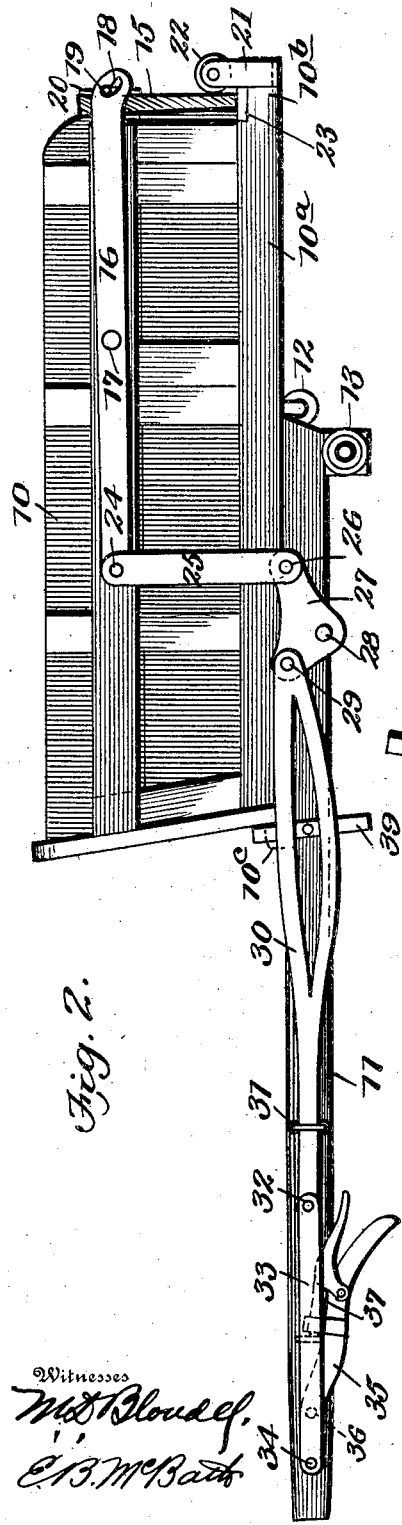
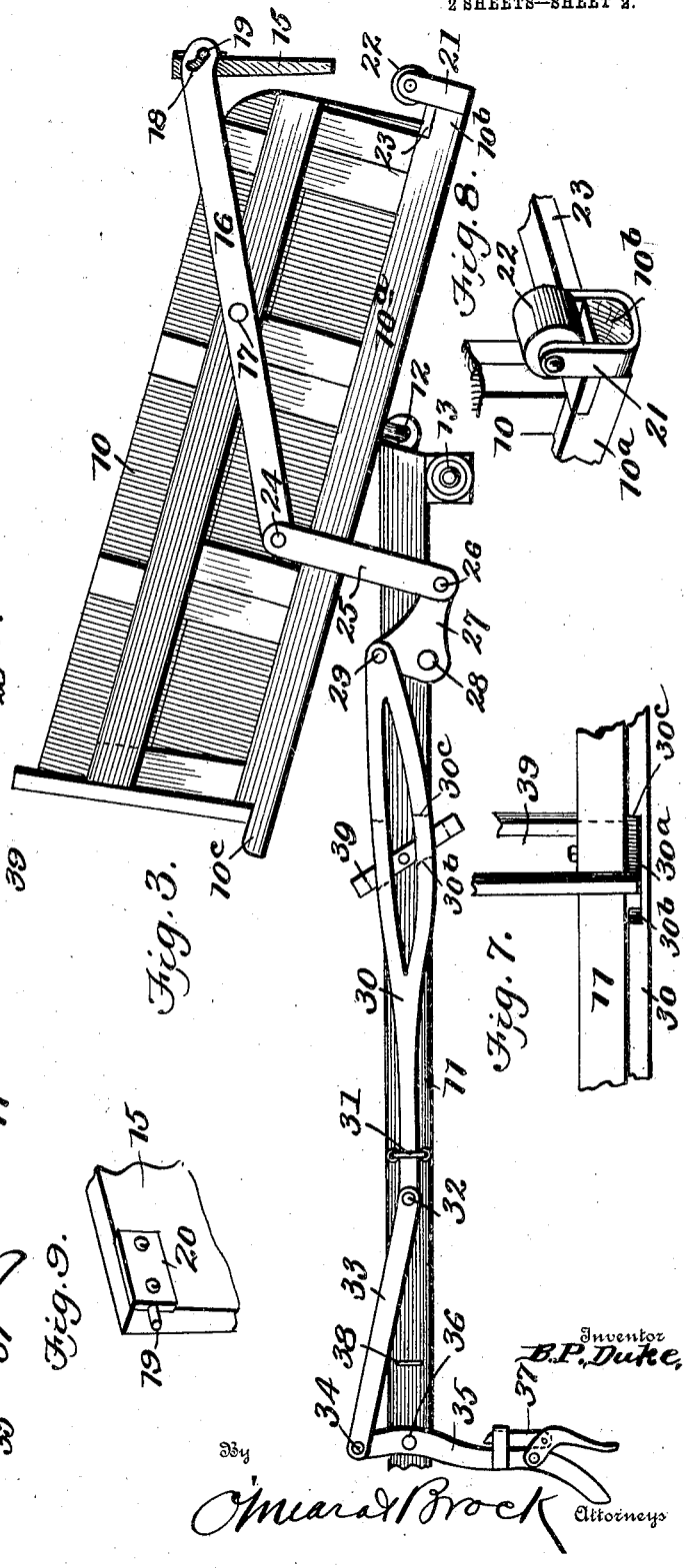

No. 789,212.  
Patented May 9, 1905.

UNITED STATES PATENT OFFICE.

BENJAMIN P. DUKE, OF BALTIMORE, MARYLAND.

END-GATE ATTACHMENT.

SPECIFICATION forming part of Letters Patent No. 789,212, dated May 9, 1905.

Application filed April 29, 1904. Serial No. 205,525.

*To all whom it may concern:*

Be it known that I, BENJAMIN P. DUKE, a citizen of the United States, residing at Baltimore, in the State of Maryland, have invented a new and useful Improvement in End-Gate Attachments, of which the following is a specification.

This invention relates generally to carts or wagons, and more particularly to a dumping cart or wagon of the kind usually employed for carrying bricks, dirt, or other material which is usually dumped in bulk.

The object of my invention is to provide a simple and efficient construction whereby the end-gate of the cart or wagon may be lifted simultaneously with the dumping of the cart or wagon; and a still further object is to provide the operating mechanism upon the shaft of the vehicle whereby the end-gate is raised and the wagon dumped, said mechanism being hand-operated and of such construction that the driver can accomplish the dumping operation with one hand, thereby enabling him to retain control of the reins with the other hand.

Another object of the invention is to provide improved means for unlocking the cart or wagon as the end-gate is elevated; and another object is to provide for guiding the end-gate into a closed position as the wagon or cart body is moved up to its normal position and also to provide for the locking of the end-gate and the wagon or cart body when returned to their normal or closed positions.

With these various objects in view my invention consists in the novel features of construction and combination, all of which will be fully described hereinafter and pointed out in the claims.

Figure 1:
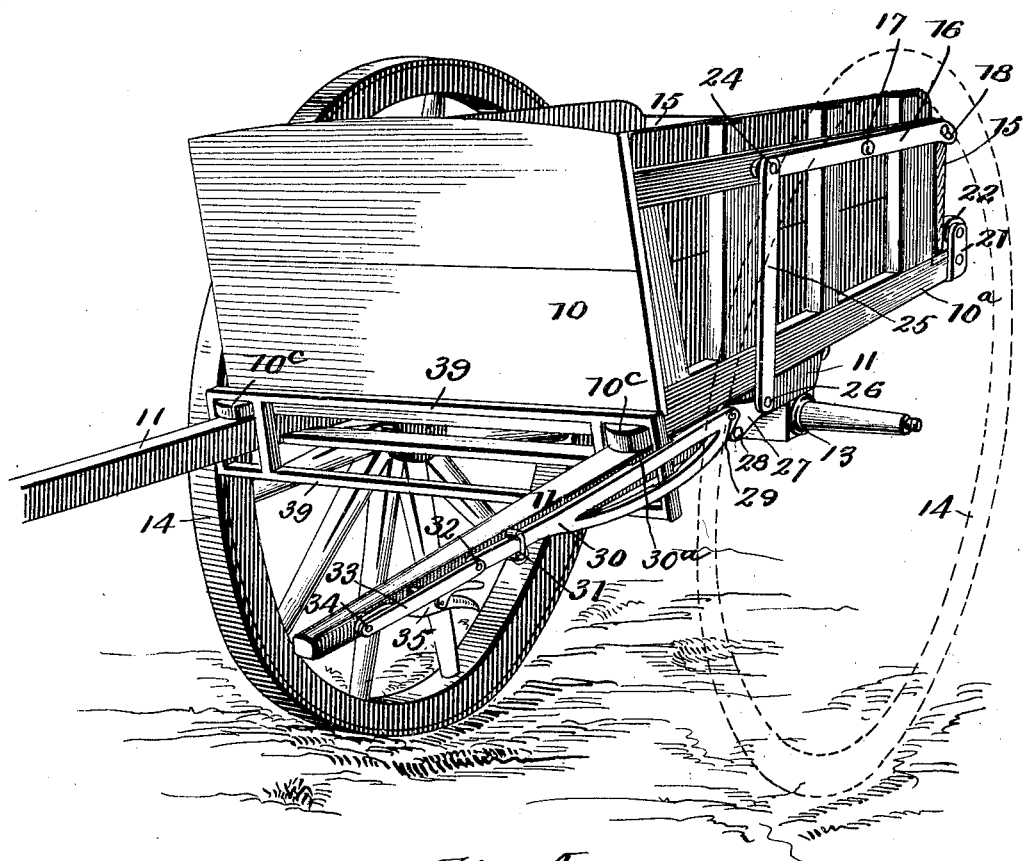
Figure 4:
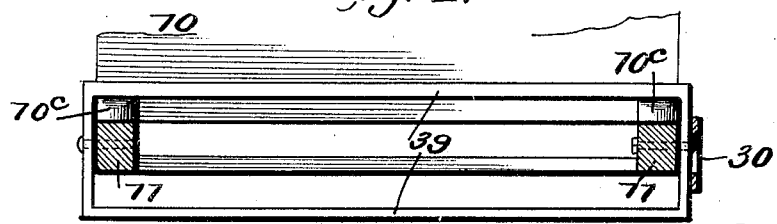
Figure 5:
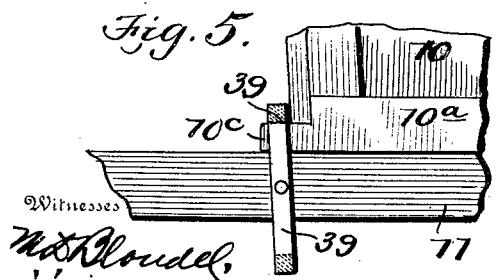
Figure 6:

In the drawings forming a part of this application, Figure 1 is a perspective view showing the practical application of my invention, the wheel at one side being omitted for the purpose of more clearly illustrating the details of the invention. Fig. 2 is a side view of the cart or wagon body when in a closed or carrying position. Fig. 3 is a side view showing the position of the various parts assumed during the dumping operation. Fig. 4 is a detail face view of the frame for locking the cart or wagon body. Fig. 5 is a sectional elevation showing the position of said frame when the wagon-body is locked. Fig. 6 is a sectional elevation showing the position of said frame when the body is unlocked. Fig. 7 is a detail view illustrating the means for operating said frame. Fig. 8 is a detail perspective view showing the guide-roller for guiding the end of the end-gate into a closed position. Fig. 9 is a detail view showing the pivot carried at the end of the end-gate.

In carrying out my invention I employ a cart or wagon body 10, which is pivotally connected to the rear ends of the thills 11 by means of the usual hook connection 12, the thills 11 being mounted upon the axle 13, carrying the supporting-wheels 14, all of said parts being of the usual or any approved construction. The end-gate 15 is carried between the rear ends of the levers 16, pivoted at 17 upon the opposite sides of the cart or wagon body. The rear ends of the levers 16 are provided with curved slots 18, in which fit the pivot-studs 19, carried by the plates 20, attached to the upper corners of the end-gate, the purpose of said slots being to permit a limited amount of play of the end-gate, so that it can be conveniently guided into a locked position when the body is raised from a dumping position to an elevated or closed position.

For the purpose of securing the lower end of the end gate I employ a clip 21, carrying a roller 22, said clip being connected to the rearwardly-extending end $10^b$ of the side beam $10^a$ of the cart or wagon, the lower end of the end-gate passing between the end of the wagon-body and the roller 22, as most clearly shown in Figs. 2 and 3, it being understood that as the wagon-body is raised and the end-gate lowered the free end of the gate will engage the roller and be guided into a locked position. The lower end of the end-gate rests upon a cross-timber 23, which connects the rearwardly-extending ends $10^b$ of the side beam $10^a$.

The forward ends of the levers 16 are pivotally connected at 24 to the link-rods 25, said link-rods 25 being pivotally connected at 26 to the bell-crank levers 27, said bell-crank levers being mounted upon a shaft 28, which is journaled in suitable bearings arranged upon the under side of the thills 11. The left-hand bell-crank lever 27 has a bar 30 pivotally connected to its forward end, as shown at 29. The forward end of said bar 30, working in a suitable guide 31, is arranged upon the side of the thill and is pivotally connected at 32 to the rear end of a rod 33, which is pivotally connected at 34 to a hand-lever 35, said hand-lever 35 being pivoted at 36 to the side of the thill 11 and provided with a thumb-latch 37, which engages a keeper 38 when the parts are locked, as shown in Figs. 1 and 2.

38 indicates a rectangular-shaped frame having its side members pivotally connected to the thills 11, said frame being adapted to embrace the forwardly-projecting ends 10$^c$ of the side beams 10$^a$ for the purpose of locking the cart or wagon body to the thills, as most clearly shown in Figs. 1, 2, and 5. For the purpose of disengaging the forwardly-projecting ends the locking-frame is tilted, as shown in Fig. 6, and to accomplish this tilting operating I produce a recess 30$^a$ in the inner face of the operating-bar 30, the front wall of said recess being inclined, as shown at 30$^b$, so that as the bar 30 is moved rearwardly, as shown in Fig. 3, the frame will be tilted and the forward end of the cart or wagon released. Upon the reverse movement, however, of the bar 30, the frame 39 will be shifted to the position shown in Figs. 1 and 2, thereby locking the cart or wagon body to the thills. Whenever it is desired to dump the wagon, the thumb-latch 37 is withdrawn from the keeper 38 and the lever 35 thrown downwardly, as shown in Fig. 3. This operation forces the bar 30 rearwardly, turning the bell-crank lever, which pulls downwardly upon the link-rod 25, and the lever 16 is rocked, elevating the end-gate, and by having the slots 18 in the lever there will be a certain amount of movement between the lever and the end-gate, so that in case the load within the cart or wagon is pressing against said end-gate the free and easy operation of the gate will not be interfered with. Simultaneous with the rear movement of the bar 30 and the rocking of the lever 16 is the tripping of the frame 39, thereby releasing the forward end of the car or wagon, and the center of gravity being slightly beyond the pivotal point the cart or wagon will quickly and easily dump. When the parts are returned to their normal positions, as shown in Fig. 2, the hand-lever is thrown up and locked, the forward movement of the bar 30 serving to throw the frame 39 back over the ends 10$^c$, the rear wall 30$^c$ engaging the frame and throwing it to this position, and then inasmuch as the hand-lever 35 is locked the bar 30 will also be locked and it will be impossible for the frame to become disengaged from the ends 10$^c$.

It will thus be seen that I provide a simple and efficient means for releasing the cart or wagon body and simultaneously elevating the end-gate, and it will also be noted that these operations are accomplished through the operation of a single hand-lever, so that the complete dumping operation can be accomplished with one hand, thereby permitting the driver to retain control of the reins with the other hand.

Having thus fully described my invention, what I claim as new, and desire to secure by Letters Patent, is—

1. The combination with the dumping-body and thills of the end-gate and the levers carrying said end-gate, the locking-frame attached to the thills for locking the forward end of the body, the operating-bar arranged upon one of the thills and adapted to engage the locking-frame, said operating-bar being operatively connected with the end-gate levers, and means for operating and locking the operating-bar.

2. The combination with the dumping-body having rear extensions provided with guide-rollers, of the end-gate having pivoted studs at its upper corners, the levers pivoted to the sides of the dumping-body, the rear end of said levers having curved slots produced therein and in which the pivot-studs work, and means for operating said levers.

3. The combination with the dumping-body and thills, said body having forward extensions, the rectangular-shaped locking-frame pivoted to the thills and adapted to engage the forward extensions of the body, and means arranged upon the thill for shifting said frame to engage and disengage the forward extensions of the dumping-body.

4. The combination with the dumping-wagon and thills, of the locking-frame pivoted to the thills and adapted to engage the forward extensions carried by the dumping-body, an operating-bar arranged upon the side of the thill and having its inner face recessed to embrace one of the side members of the frame, a hand-lever pivoted to the side of the thill and connected to the operating-bar together with means for locking said hand-lever.

5. The combination with the dumping-body and thills, said dumping-body having front and rear extensions, the guide-rollers carried by the rear extensions, the end-gate having pivoted studs, the levers pivoted to the studs of the body and having curved slots at their rear ends in which the pivoted studs fit, the link-rods connected to the forward ends of said levers, the bell-crank levers mounted upon the shaft connected to the thills and to which the link-rods are pivoted, a longitudinal-movable operating-bar pivotally connected to one of the bell-crank levers, the inner face of said bar being recessed, a hand-lever pivoted to the thill and connected to the operating-bar by means of a rod, said hand-lever being provided with means for locking the same and a frame pivotally connected to the thills and adapted to engage the forward extensions of the body, one of the side members of said frame resting in the recess in the side of the operating-bar for the purpose set forth.

BENJAMIN P. DUKE.

Witnesses:
 JASPER M. BERRY, Jr.,
 PHILIP J. WALSH.